United States Patent [19]
Nerone

[11] Patent Number: 5,939,834
[45] Date of Patent: *Aug. 17, 1999

[54] POWER SUPPLY CIRCUIT WITH COMPLEMENTARY CONVERTER SWITCHES

[75] Inventor: Louis R. Nerone, Brecksville, Ohio

[73] Assignee: General Electric Company, Schenectady, N.Y.

[*] Notice: This patent is subject to a terminal disclaimer.

[21] Appl. No.: 08/841,987

[22] Filed: Apr. 8, 1997

Related U.S. Application Data

[63] Continuation-in-part of application No. 08/709,063, Sep. 6, 1996.

[51] Int. Cl.$^6$ .................................................. H05B 37/02
[52] U.S. Cl. ..................... 315/209 R; 315/219; 327/291; 327/589; 363/24; 363/134
[58] Field of Search ............... 315/209 R, 307, 315/219; 327/291, 589; 363/24, 134

[56] References Cited

U.S. PATENT DOCUMENTS

| | | | |
|---|---|---|---|
| 4,463,286 | 7/1984 | Justice | 315/219 |
| 4,546,290 | 10/1985 | Kerekes | 315/209 R |
| 4,588,925 | 5/1986 | Fahnrich et al. | 315/101 |
| 4,647,817 | 3/1987 | Fahnrich et al. | 315/104 |
| 4,677,345 | 6/1987 | Nilssen | 315/209 R |
| 4,692,667 | 9/1987 | Nilssen | 315/209 R |
| 4,937,470 | 6/1990 | Zeiler | 323/289 X |
| 4,945,278 | 7/1990 | Chern | 315/209 R |
| 5,223,767 | 6/1993 | Kulka | 315/209 R |
| 5,309,062 | 5/1994 | Perkins et al. | 315/53 |
| 5,341,068 | 8/1994 | Nerone | 315/219 |
| 5,349,270 | 9/1994 | Roll et al. | 315/209 R |
| 5,387,847 | 2/1995 | Wood | 315/209 R |
| 5,406,177 | 4/1995 | Nerone | 315/307 |
| 5,514,981 | 5/1996 | Tam et al. | 326/80 |

Primary Examiner—Arnold Kinkead
Attorney, Agent, or Firm—Charles E. Bruzga, Esq.

[57] ABSTRACT

A power supply circuit for powering a load circuit comprises a load circuit and includes a converter circuit for inducing current in the load circuit. The converter circuit comprises first and second converter switches serially connected in the foregoing order between a bus conductor at a d.c. voltage and a reference conductor, and connected together at a common node through which the load current flows. The first and second converter switches each comprise respective interconnected control nodes and references connected together at the common node. The voltage between a control node and associated reference node determines the conduction state of the associated switch. A first node is coupled to the bus conductor, and a second node is coupled to the reference conductor. A bridge network is connected between the first and second nodes and has first and second input nodes on which respective first and second input signals are applied. First and second output nodes are respectively connected to the common and control nodes to control the switching state of the converter switches. The first and second pairs of gate control switches are arranged to cause repetitive cycling through at least the following states of the first and second converter switches being respectively: on and off, turned off and already off, off and on, already off and turned off.

18 Claims, 2 Drawing Sheets

5,939,834

POWER SUPPLY CIRCUIT WITH COMPLEMENTARY CONVERTER SWITCHES

This is a continuation-in-part of application Ser. No. 08/709,063, filed on Sep. 6, 1996.

FIELD OF THE INVENTION

The present invention relates to a power supply circuit including a converter for powering a variety of loads, and, more particularly, to such a power supply circuit wherein the converter employs a pair of complementary switches.

BACKGROUND OF THE INVENTION

Power supply circuits for various loads typically include a converter for supplying a.c. or d.c. current to a load. Such circuits typically include a pair of non-complementary switches in the converter. For example, it is common to use a pair of identical, n-channel enhancement mode MOSFETs as the switches. However, the use of such non-complementary MOSFETs has various drawbacks.

For instance, each of the non-complementary MOSFETs must be controlled by a separate gate-to-source (or control) voltage. This requires level shifting of voltage to couple a single control signal to each of the gate-to-source voltages of the pair of MOSFETs. Such level shifting can be accomplished by a transformer or by conventional bootstrapping means. The transformer method works well at high speeds, e.g., over 20 kilohertz, but is costly and hard to control. The bootstrapping method, usually implemented by an Integrated Circuit (IC), has good control capability, but is unable to work at high speeds, beyond 100 kilohertz..

SUMMARY OF THE INVENTION

In accordance with an exemplary embodiment of the invention, a power supply circuit for powering a load circuit is provided. It includes a converter circuit for inducing current in the load circuit. The converter circuit comprises first and second converter switches serially connected in the foregoing order between a bus conductor at a d.c. voltage and a reference conductor, and connected together at a common node through which the load current flows. The first and second converter switches each comprise respective interconnected control nodes and references connected together at the common node. The voltage between a control node and associated reference node determines the conduction state of the associated switch. A first node is coupled to the bus conductor, and a second node is coupled to the reference conductor. A bridge network is connected between the first and second nodes and has first and second input nodes on which respective first and second input signals are applied. First and second output nodes are respectively connected to the common and control nodes to control the switching state of the converter switches. The first and second pairs of gate control switches are arranged to cause repetitive cycling through at least the following states of the first and second converter switches being respectively: on and off, turned off and already off, off and on, already off and turned off.

The foregoing power supply circuit achieves good control capability as well as the ability to work at high speeds. It also is suitable for integration into an integrated circuit (IC). This is because the circuit includes its own energy source, which can provide the necessary power for generating the first and second input signals that ultimately control the converter switches.

DETAILED DESCRIPTION OF THE INVENTION

Figure 1:
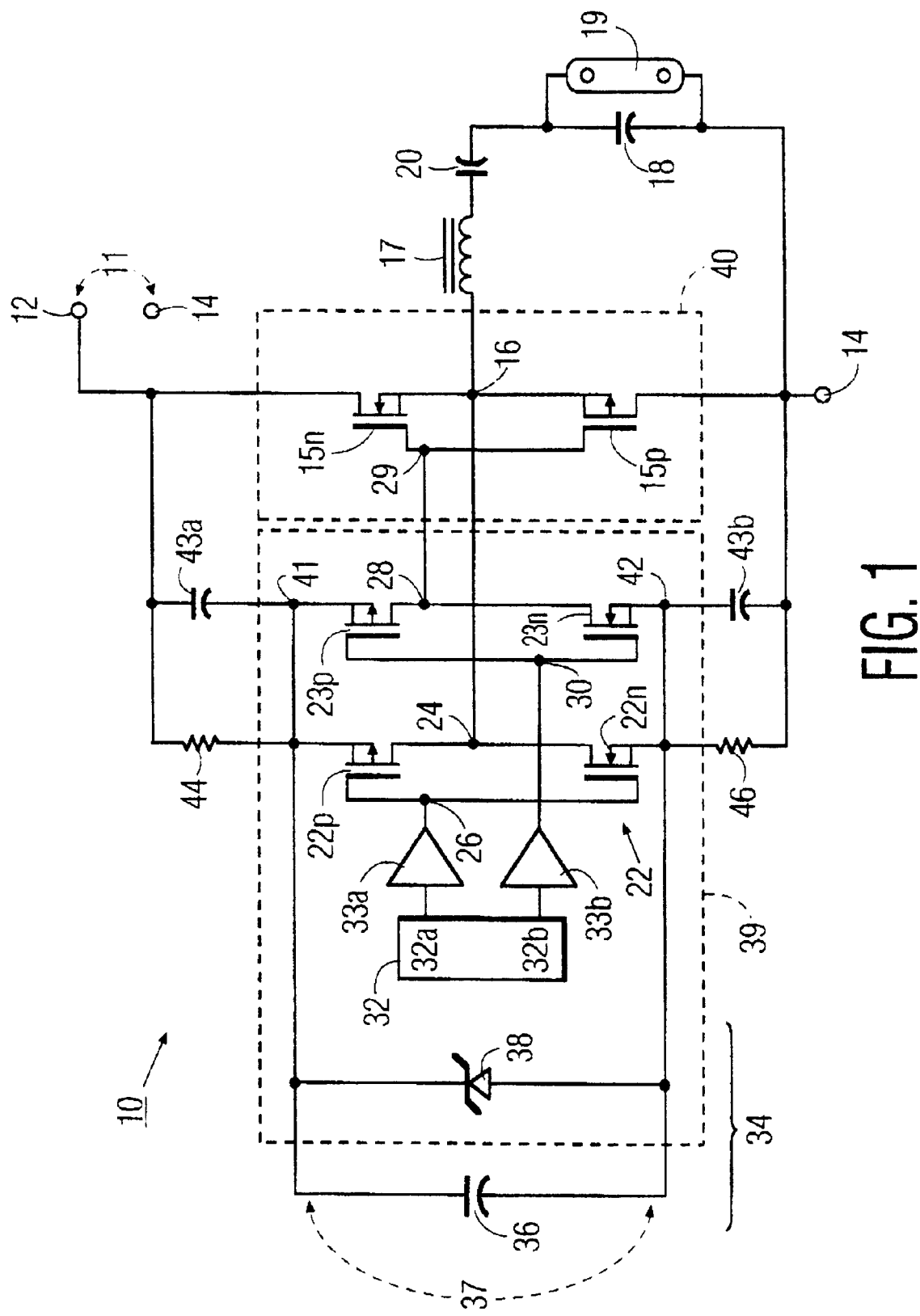
FIG. 1 is a schematic diagram, partially in block form, of an exemplary power supply circuit employing complementary switches in a d.c.-to-a.c. converter, in accordance with the invention.

FIG. 1 shows an exemplary power supply 10 comprising a ballast circuit for a gas discharge lamp. A d.c. bus voltage 11 is applied to bus conductor 12 with respect to a reference conductor 14. The potential of reference conductor 14 is not necessarily at ground; it simply is a potential less than that of bus conductor 12. As shown, ballast circuit 10 employs a pair of switches 15n and 15p for implementing a d.c.-to-a.c. conversion. Switch 15n may be an n-channel, enhancement mode MOSFET, while switch 15p may be a p-channel, enhancement mode MOSFET. Such switches are, therefore, complementary to each other. The sources of MOSFET switches 15n and 15p are interconnected at common node 16, which node is alternately connected to bus conductor 12 and then to reference conductor 14, and back to bus conductor 12, and so on. Other complementary switches could be used, such as other source-to-source connected MOSFET pairs, Bipolar Junction Transistors, Insulated Gate Bipolar Transistors, MOS-Controlled Thyristors, or Gate Turn-Off devices.

Converter switches 15n and 15p supply a.c. current to a resonant load circuit comprised of a resonant inductor 17 and a resonant capacitor 18, which capacitor is shunted by lamp 19, such as a fluorescent lamp. A d.c. blocking capacitor 20 is also provided in the resonant load circuit. Converter switches 15n and 15p are, in turn, controlled by a bridge network 22 preferably formed of drain-connected, complementary conduction mode MOSFETs, which control the gates of the converter switches.

Specifically, bridge network 22 may comprise a first pair of such MOSFETs designated 22p and 22n to represent p-channel and n-channel, enhancement mode MOSFETs, respectively; and a second pair of such MOSFETs designated 23p and 23n for the same reason. As will be appreciated from FIG. 1, each pair 22p, 22n and 23p, 23n of MOSFETs have respective interconnected drains and interconnected gates. The drains of pair 22p, 22n are connected to a first output node 24 of bridge network 22, which is connected to common node 16; the gates of such pair are connected to a first input node 26 of bridge network 22. Similarly, the drains of pair 23p, 23n are connected to a second output node 28 of bridge network 22, which is connected to a common control node 29 of the converter switches; the gates of such pair are connected to a second input node 30 of bridge network 22. Preferably, pairs 22p, 22n and 23p, 23n of bridge network 22 each comprise drain-connected CMOS transistors, which are commonly available.

A first input signal is supplied to first input node 26 by a signal source 32, via a, e.g., non-inverting buffer 33a; the first input signal is designated by 32a in the block for the signal source. A second input signal is supplied to second input node 30, via a, e.g., non-inverting buffer 33b, the second input signal being designated by 32b in the block for the signal source. The first and second input signals will be described in detail below.

In accordance with an optional aspect of the invention, an energy source 34 is provided for supplying energy both to power signal source 32 and to supply, via buffers 33a and 33b, the energy needed to control switch pairs 22p, 22n and 23p, 23n. As will be detailed below, during certain modes of operation of converter switches 15n and 15p, residual energy in resonant inductor 17 is used to replenish energy dissipated by source 34 in performing these powering functions. Energy source 34 may comprise a capacitor 36 and a Zener diode 38.

Beneficially, the circuitry inside of dashed-line box 39 described so far can be incorporated into an integrated circuit (IC) in a hybrid or monolithic form, and the converter switches themselves, enclosed in dashed-line box 42, can also be incorporated into the same IC in a hybrid or monolithic form.

Each of gate control switch pairs 22p, 22n and 23p, 23n are connected between a first node 41 at their upper shown-portion, and a second node 42 at their lower-shown portion. A first bootstrap capacitor 43a and a bias resistor 44 are connected between first node 41 and bus conductor 12. A second bootstrap capacitor 43b and a bias resistor 46 are connected between second node 42 and reference conductor 14.

Bootstrap capacitors 43a and 43b preferably perform dual functions. One function is to act as a conventional snubber capacitor for the purpose of causing converter switches 15n and 15p to switch softly, as opposed to abruptly, which considerably reduces energy dissipation in the switches when they change state. The second function of the bootstrap capacitors is a bootstrapping function, wherein residual energy from resonant inductor 17 is used to change the states of charge of the bootstrap capacitors, and in the process to replenish energy of source 34 used in powering signal source 32 and buffers 33a and 33 b. Bootstrap capacitors 43a and 43b, therefore, are preferably sized to perform the bootstrap function, which may require a larger size than is required merely to perform the snubbing function. The bootstrap operation of the capacitors is detailed below.

Figure 2A:
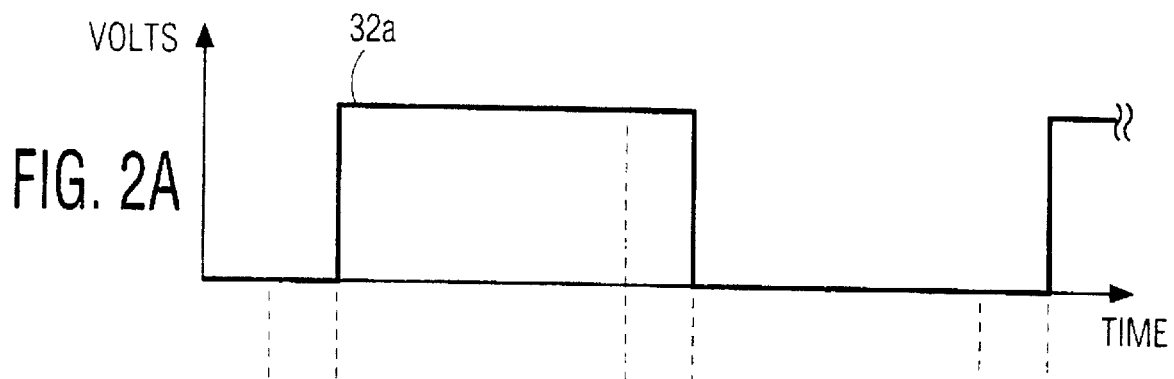
FIGS. 2A and 2B respectively show first and second input signal 32a and 32b used in the circuit of FIG. 1.
Figure 2B:
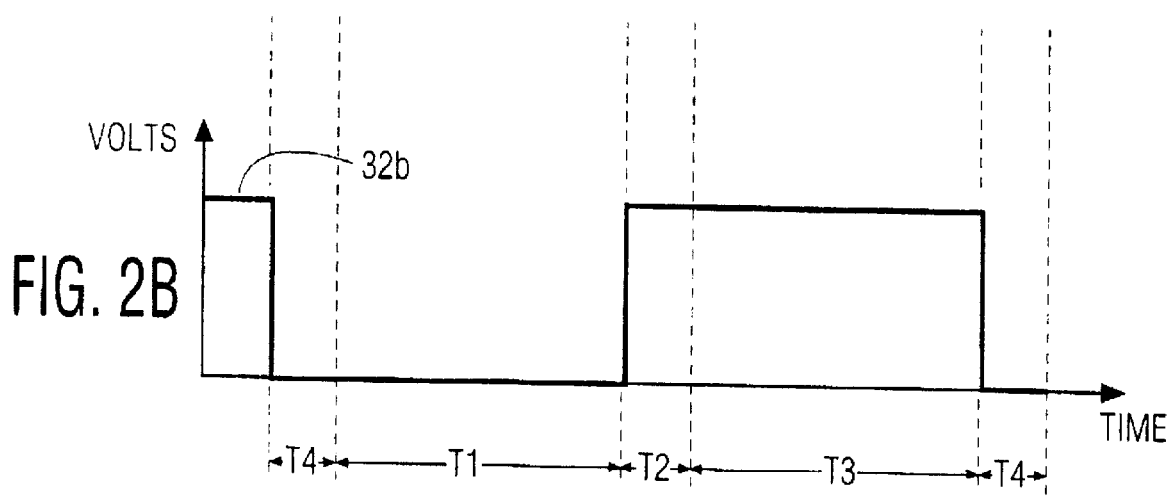

FIGS. 2A and 2B respectively show first and second input signals 32a and 32b produced by signal source 32 of FIG. 1. These signals vary between "1" (or high) and "0" (or low), which refer to logic levels, whereby logic level "1" may be 5 volts, for example. In accordance with the invention, signal source 32 (FIG. 1) provides input signals pairs 32a, 32b that repetitively cycle through at least the four illustrated states of 1-0, 1-1, 0-1 and 1-0. These states respectively occur during time periods T1, T2, T3 and T4. As can be seen in FIG. 2B, after time period T4, time period T1 begins again. One or more other time periods could be interposed among time periods T1 through T4, and represent different input signal pairs 32a, 32b, if desired. Operation of ballast circuit 10 of FIG. 1 is now described during each of time periods T1–T4.

The following table identifies operating states for input signals 32a and 32b, and the conduction states of transistors 22p, 22n, 23p and 23n of bridge network 22. After the table, the conduction states of converter switches 15n and 15p, and the bootstrap operation of capacitors 43a and 43b, are described.

|    | 32a | 32b | 22p | 22n | 23p | 23n |
|----|-----|-----|-----|-----|-----|-----|
| T1 | 1   | 0   | OFF | ON  | ON  | OFF |
| T2 | 1   | 1   | OFF | ON  | OFF | ON  |
| T3 | 0   | 1   | ON  | OFF | OFF | ON  |
| T4 | 0   | 0   | ON  | OFF | ON  | OFF |

During time period T1, converter switch 15n is on (or conducting) and switch 15p is off. During this time, common node 16 is connected to bus conductor 12 so as to be at bus voltage 11, which voltage is impressed across bootstrap capacitor 43b by virtue of switch 22n being on. Voltages across the capacitors in FIG. 1 are from top-to-bottom. Additionally, bus voltage 11 is impressed across the serially connected capacitors 43a, 36 and 43b. With voltage 37 being the top-to-bottom voltage across energy source capacitor 36, the foregoing capacitors then respectively have voltages across them of negative voltage 37 of typically −12 volts for capacitor 43a, voltage 37 of typically 12 volts for capacitor 36, and bus voltage 11 for capacitor 43b.

During time period T2, converter switch 15n is turned off, with switch 15p remaining off as it was in time period T1 . Residual energy in resonant inductor 17 causes current to flow through such inductor from left to right in FIG. 1, such current passing upwardly through second bootstrap capacitor 43b, through switch 22n which is on at this time, and back to resonant inductor 17. Meanwhile, bus voltage 11 continues to be impressed across the serial combination of capacitors 43a, 36 and 43b. As a result, the voltage on capacitor 43b changes from bus voltage 11 to negative voltage 37 of typically −12 volts, while the voltage on capacitor 43a changes from negative voltage 37 of typically −12 volts to bus voltage 11. In this process, charge from capacitor 43b is transferred via energy source capacitor 36 to capacitor 43a. However, some of the charge from capacitor 43b is retained by capacitor 36, so as to replenish energy used in powering signal source 32 and buffers 33a and 33b.

In the next time period T3, converter switch 15n remains off and switch 15p is turned on. The voltages across serially connected capacitors 43a, 36 and 43b remain as set in the preceding time period T2.

In time period T4, switch 15n remains off and switch 15p is turned off. During this time residual energy in resonant inductor 17 causes current to flow through such inductor from right to left in FIG. 1. With switch 22p being on at this time, such current from resonant inductor 17 flows from node 16 to node 24 and upwardly through switch 22p to pass through bootstrap capacitor 43a. Specifically, the voltage of capacitor 43a changes from bus voltage 11 as set in time period T2 to negative voltage 37 of typically −12 volts. Since bus voltage 11 is impressed across the serial combination of capacitors 43a, 36 and 43b, the voltage of capacitor 43b changes in from negative voltage 37 of typically −12 volts set in time period T2, to bus voltage 11, while voltage 37 remains at a nearly constant voltage (e.g. 12 volts). In the process of capacitor 43b becoming charged to bus voltage 11, charge is transferred from capacitor 43a to capacitor 43b. Some charge from capacitor 43a is absorbed by energy source capacitor 36 to replenish energy dissipated in powering signal source 32 and buffers 33a and 33b.

In the foregoing manner, energy source 34 is supplied with residual energy from resonant inductor 17 during switching periods (e.g., T2, T4) when one converter switch is already off and the other is turned off.

To produce the waveforms shown in FIG. 2 for first and second input signals 32a and 32b, signal source 32 may comprise a conventional square-wave generator for first input signal 32a, such as a commonly available 555 IC timer operating in a 50 percent duty ratio mode. To produce second input signal 32b, delay circuit from first signal 32a, such as an R-C (resistive-capacitive) circuit (not shown) can be used to provide a delay, followed by a Schmitt trigger to square up the signal.

Exemplary component values for ballast circuit 10 of FIG. 1 are as follows for fluorescent lamp 19 rated at 25 watts, with a d.c. bus voltage of 150 volts:

| | |
|---|---|
| Resonant inductor 17 | 800 micro henries |
| Resonant capacitor 18 | 7.7 nanofarads |
| D.c. blocking capacitor 20 | 220 nanofarads |
| Bootstrap capacitors 43a and 43b, each | 680 picofarads |
| Bias resistors 44 and 46, each | 100k ohms |
| Zener diode 38 | 12 volts |
| Energy source capacitor 36 | 1 microfarad |

Additionally, converter switch 15n may be an IRF610, n-channel, enhancement mode MOSFET, sold by International Rectifier Company, of El Segundo, Calif.; converter switch 15p, an IRF9610, p-channel, enhancement mode MOSFET also sold by International Rectifier Company; gate control switch pairs 22p, 22n and 23p, 23n, each 4000-series pair of drain-connected CMOS transistors, such as sold by Motorola of Phoenix, Az., or available as IRF9Z10-IRFZ10 CMOS pairs sold by International Rectifier Company. Finally, exemplary times T1, T2, T3 and T4 used by signal source 32 are, respectively, 6.5 microseconds, 1 microsecond, 6.5 microseconds, and 1 microseconds.

In addition to the parallel resonant load circuit described in FIG. 1 to the right of nodes 14 and 16, the power supply circuit of the invention can work with other types of load circuits, which are mentioned as follows, but are not illustrated. For example, a series resonant load circuit could be used, including serially connected inductor, capacitor and load resistor. Additionally, as described, for instance, in "Power Supply Circuits," by S. B. Dewan and A. Straugher, published by John Wiley & Sons, Inc., New York, New York in 1975, the load circuit could comprise a Type B Chopper, in which the load current could be positive or negative, to allow energy flow to the load or from the load; a resistive-inductive load (not shown); a load comprising a serially connected inductor, resistor and a voltage source such as the so-called back EMF from a spinning electrical motor. The load could also comprise a low pass filter including, for instance, inductors, and a resistive load.

Additionally, as described for instance in "Power Electronics: Converters, Applications and Design," by Mohan et al., published by John Wiley & Sons, Inc., New York, New York, in 1989, the load circuit could comprise a half-bridge converter as described starting at page 223, or load resonant converters as described starting at page 163 such as series-loaded resonant converters and parallel-loaded resonant converters.

A suitable signal source 32 for use with the foregoing will be apparent to those of ordinary skill in the art. By way of example, the signal source may comprise a fixed or selectable frequency square-wave generator, or a pulse-width modulator with fixed or selectable frequency.

Preferably, whatever load circuit is used includes an energy-storage element, such as an inductor, for storing residual energy for charging bootstrap capacitors 43a and 43b as described above. However, loads lacking such an energy-storage element will still benefit from the instant invention, although without the ability to charge the bootstrap capacitors.

While the invention has been described with respect to specific embodiments by way of illustration, many modifications and changes will occur to those skilled in the art. For instance, is some applications it may be desirable to delete capacitor 36 and Zener diode 38 and associated circuitry for keeping capacitor 36 charged. In such case, a separate power source such as a battery could be provided for supplying power to one or both of signal source 32 and buffers 33a and 33b. It is therefore, to be understood that the appended claims are intended to cover all such modifications and changes as fall within the true spirit and scope of the invention.

What is claimed is:

1. A power supply circuit for powering a load circuit, comprising:
   (a) a load circuit;
   (b) a converter circuit for inducing current in said load circuit, comprising:
      (i) first and second converter switches serially connected in the foregoing order between a bus conductor at a d.c. voltage and a reference conductor, and being connected together at a common node through which said load current flows;
      (ii) said first and second converter switches each comprising a control node and a reference node, the voltage between such nodes determining the conduction state of the associated switch;
      (iii) the respective control nodes of said first and second converter switches being interconnected; and
      (iv) the respective reference nodes of said first and second converter
   switches being connected together at said common node;
   (c) a first node coupled to said bus conductor, and a second node coupled to said reference conductor;
   (d) a bridge network connected between said first and second nodes and having:
      (i) first and second input nodes on which respective first and second input signals are applied; and
      (ii) first and second output nodes respectively connected to said common and control nodes so as to control the switching state of said converter switches;
   (e) a signal source for providing said first and second input signals; and
   (f) bridge network being arranged to cause repetitive cycling through at least the following states of said first and second converter switches respectively being: on and off, turned off and already off, off and on, already off and turned off.

2. The power supply circuit of claim 1, wherein said signal source is arranged to cause repetitive cycling between first input signal-second input signal pairs of at least high-low, high-high, low-high, and low-low states.

3. The power supply circuit of claim 1, further comprising:
   (a) a voltage-limited energy source connected between said first and second nodes;
   (b) a bootstrap capacitor coupling said first node to said bus conductor, and a further bootstrap capacitor coupling said second node to said reference conductor;
   (c) said load circuit including an energy-storage element; and
   (d) bridge network being arranged to cause the following states of said first and second converter switches respectively being:
      (i) turned off and already off, during which time residual energy of said energy-storage element causes a shift in energy from one of said bootstrap capacitors to the other of said bootstrap capacitors via said energy source, thereby replenishing said source with energy; and (ii) already off and turned off, during which time residual energy of said energy-storage element causes a shift in energy from said other of said bootstrap capacitors to said one of said bootstrap capacitors via said energy source, thereby replenishing said source with energy.

4. The power supply circuit of claim 3, wherein said energy-storage element comprises an inductance.

5. The power supply circuit of claim 3, further including means to supply power to said signal source and said bridge network from said energy storage source.

6. The power supply circuit of claim 5, wherein said bridge network and said signal source are contained in an integrated circuit.

7. The power supply circuit of claim 6, wherein said energy source contains a Zener diode for voltage-limiting purposes, said Zener diode also being contained in said integrated circuit.

8. The power supply circuit of claim 6, wherein said first and second converter switches are also contained in said integrated circuit.

9. The power supply circuit of claim 1, wherein said bridge network comprises:

(a) a first pair of gate control switches connected between said first and second nodes, having complementary conduction modes which change in response to a first input signal applied to commonly connected control nodes of said switches, and being connected together serially at said first output node; and (b) a second pair of gate control switches connected between said first and second nodes, having complementary conduction modes which change in response to a second input signal applied to commonly connected control nodes of said switches, and being connected together serially at said second output node.

10. The power supply circuit of claim 9, wherein said first and second pairs of gate control switches comprise drain-connected CMOS transistors, with like-conduction mode transistors being connected to said first node.

11. A power supply circuit for a load circuit, comprising:

(a) a load circuit;

(b) a converter circuit for inducing current in said load circuit, comprising:

(i) first and second converter switches serially connected in the foregoing order between a bus conductor at a d.c. voltage and a reference conductor, and being connected together at a common node through which said load current flows;

(ii) said first and second converter switches each comprising a control node and a reference node, the voltage between such nodes determining the conduction state of the associated switch;

(iii) the respective control nodes of said first and second converter switches being interconnected; and (iv) the respective reference nodes of said first and second converter switches being connected together at said common node;

(c) a first node coupled to said bus conductor, and a second node coupled to said reference conductor; and (d) a first control network comprising a pair of gate control switches connected between said first and second nodes, having complementary conduction modes which change in response to a first input signal applied to commonly connected control nodes of said switches, and being connected together serially at a first output node;

(e) a second control network comprising a pair of gate control switches connected between said first and second nodes, having complementary conduction modes which change in response to a second input signal applied to commonly connected control nodes of said switches, and being connected together serially at a second output node;

(f) the respective switches of said first and second control networks connected to said first node having the same conduction mode;

(g) said first and second output nodes being respectively connected to said common and control nodes so as to control the switching state of said converter switches; and (h) a signal source for providing said first and second input signals;

(i) said signal source being arranged to cause repetitive cycling between first input signal-second output signal pairs of at least high-low, high-high, low-high, and low-low states.

12. The power supply circuit of claim 11, further comprising:

(a) a voltage-limited energy source connected between said first and second nodes;

(b) a bootstrap capacitor coupling said first node to said bus conductor, and a further bootstrap capacitor coupling said second node to said reference conductor;

(c) said load circuit including an energy-storage element; and (d) said first and second pairs of gate control switches being arranged to cause the following states of said first and second converter switches respectively being:

(i) turned off and already off, during which time residual energy of said energy-storage element causes a shift in energy from one of said bootstrap capacitors to the other of said bootstrap capacitors via said energy source, thereby replenishing said source with energy; and (ii) already off and turned off, during which time residual energy of said energy-storage element causes a shift in energy from said other of said bootstrap capacitors to said one of said bootstrap capacitors via said energy source, thereby replenishing said source with energy.

13. The power supply circuit of claim 12, wherein said energy-storage element comprises an inductance.

14. The power supply circuit of claim 11, wherein said first and second pairs of gate control switches comprise drain-connected CMOS transistors.

15. The power supply circuit of claim 12, further including means to supply power to said signal source and said first and second control networks from said energy storage source.

16. The power supply circuit of claim 15, wherein said first and second pairs of control switches and said signal source are contained in an integrated circuit.

17. The power supply circuit of claim 16, wherein said energy source contains a Zener diode for voltage-limiting purposes, said Zener diode also being contained in said integrated circuit.

18. The power supply circuit of claim 16, wherein said first and second converter switches are also contained in said integrated circuit.

* * * * *